US012668151B2

(12) United States Patent (10) Patent No.: US 12,668,151 B2

Okabe et al. (45) Date of Patent: Jun. 30, 2026

(54) POWER STORAGE SYSTEM

(71) Applicant: HONDA MOTOR CO., LTD., Tokyo (JP)

(72) Inventors: Hiroto Okabe, Tokyo (JP); Tetsuhiro Kobayashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 794 days.

(21) Appl. No.: 18/090,084

(22) Filed: Dec. 28, 2022

(65) Prior Publication Data

US 2023/0226947 A1 Jul. 20, 2023

(30) Foreign Application Priority Data

Jan. 14, 2022 (JP) ................................. 2022-004701

(51) Int. Cl.
B60L 58/15 (2019.01)
B60L 3/12 (2006.01)
(Continued)

(52) U.S. Cl.
CPC .............. B60L 58/15 (2019.02); B60L 53/20 (2019.02); B60L 58/10 (2019.02); H02J 7/00 (2013.01);
(Continued)

(58) Field of Classification Search
CPC .. B60L 58/15; B60L 58/10; B60L 3/12; B60L 53/20; B60L 2240/547;
(Continued)

(56) References Cited

U.S. PATENT DOCUMENTS

2006/0087291 A1 4/2006 Yamauchi
2009/0266631 A1 10/2009 Kikuchi
(Continued)

FOREIGN PATENT DOCUMENTS

CN 113442786 A * 9/2021 .............. B60L 58/10
JP 2005-156351 A 6/2005
(Continued)

OTHER PUBLICATIONS

Nov. 29, 2023, Translation of Japanese Office Action issued for related JP Application No. 2022-004701.
(Continued)

*Primary Examiner* — Julian D Huffman
*Assistant Examiner* — Nathan J Instone
(74) *Attorney, Agent, or Firm* — Paratus Law Group, PLLC

(57) ABSTRACT

A power storage system includes: a battery; a voltmeter configured to measure voltage of the battery; an ammeter configured to measure current of the battery; and processing circuitry configured to control charge of the battery to prevent charging power exceeding charging power upper limit from being supplied to the battery. The processing circuitry is further configured to: calculate first charging power, at which the battery reaches voltage upper limit, based on estimated open-circuit voltage, which is an estimated value of open-circuit voltage of the battery, and first estimated internal resistance; calculate second charging power, at which the battery reaches the voltage upper limit, based on the voltage, the current, and second estimated internal resistance; and set the charging power upper limit, based on the first charging power and the second charging power.

5 Claims, 3 Drawing Sheets

(51) Int. Cl.

| | |
|---|---|
| *B60L 53/20* | (2019.01) |
| *B60L 58/10* | (2019.01) |
| *H02J 7/00* | (2026.01) |
| *H02J 7/04* | (2006.01) |
| *H02J 7/82* | (2026.01) |
| *H02J 7/90* | (2026.01) |
| *H02J 7/94* | (2026.01) |
| *H02J 7/96* | (2026.01) |

(52) U.S. Cl.
CPC    *H02J 7/04* (2013.01); *H02J 7/82* (2026.01);
*H02J 7/90* (2026.01); *H02J 7/933* (2026.01);
*H02J 7/94* (2026.01); *H02J 7/96* (2026.01);
*B60L 3/12* (2013.01); *B60L 2240/547*
(2013.01); *B60L 2240/549* (2013.01)

(58) Field of Classification Search
CPC ..... B60L 2240/549; H02J 7/00; H02J 7/0048;
H02J 7/007; H02J 7/00712; H02J
7/00714; H02J 7/007182; H02J 7/04
USPC ........................................................ 320/136
See application file for complete search history.

(56)                References Cited

U.S. PATENT DOCUMENTS

| | | | |
|---|---|---|---|
| 2017/0059662 A1 | 3/2017 | Cha et al. | |
| 2023/0236256 A1 | 7/2023 | Okabe et al. | |
| 2025/0015622 A1* | 1/2025 | Zhang | .................. H02J 7/0048 |

FOREIGN PATENT DOCUMENTS

| | | | | |
|---|---|---|---|---|
| JP | 2006129588 A | * | 5/2006 | ............ H02J 7/0069 |
| JP | 2007-306771 A | | 11/2007 | |
| JP | 2010169609 A | * | 8/2010 | |
| JP | 2017-203659 A | | 11/2017 | |
| JP | 2023-107661 A | | 8/2023 | |

OTHER PUBLICATIONS

Apr. 16, 2024, Translation of Japanese Office Action issued for related JP Application No. 2022-004701.

* cited by examiner

POWER STORAGE SYSTEM

CROSS-REFERENCE TO RELATED APPLICATION

This application is based on and claims priority under 35 USC § 119 from Japanese Patent Application No. 2022-004701, filed on Jan. 14, 2022, the entire contents of which are incorporated herein by reference.

TECHNICAL FIELD

The present invention relates to a power storage system.

BACKGROUND

In recent years, as a specific countermeasure against global climate change, efforts for implementing a low-carbon society or a decarbonized society have been active. In vehicles such as automobiles, a reduction in $CO_2$ emission amount is strongly required, and electrification of a drive source is rapidly advancing. Specifically, development of vehicles (hereinafter, also referred to as "electrically driven vehicles") such as electrical vehicles or hybrid electrical vehicles, which include an electric motor as a drive source and a battery as a secondary battery capable of supplying electric power to the electric motor, is underway.

In a power storage system including a battery, limitation may be set on charging power, which is power for charging the battery, and/or discharging power, which is power discharged from the battery, in order to maintain performance and reliability of the battery. For example, JP2006-129588A discloses: determining a current voltage function of a secondary battery, based on charging/discharging current and charging/discharging voltage of the secondary battery; calculating discharging current limit $I_{max}$ and/or charging current limit $I_{min}$, based on an intersection of the current voltage function with a predetermined voltage lower limit $V_{min}$ for preventing overdischarge of the secondary battery and/or a predetermined voltage upper limit $V_{max}$ for preventing overcharge of the secondary battery; and preventing current exceeding the current limit $I_{max}$ and/or current below charging current limit $I_{min}$ from flowing through the secondary battery.

There is, however, room for improvement to make it possible to appropriately control the charging or discharging power for a battery.

An object of the present disclosure is to provide a power storage system capable of appropriately controlling the charging or discharging power for a battery.

SUMMARY

A power storage system according to an aspect of the present disclosure includes: a battery; a voltmeter configured to measure voltage of the battery; an ammeter configured to measure current of the battery; and processing circuitry configured to control charge of the battery to prevent charging power exceeding charging power upper limit from being supplied to the battery. The processing circuitry is further configured to: calculate first charging power, at which the battery reaches voltage upper limit, based on estimated open-circuit voltage, which is an estimated value of open-circuit voltage of the battery, and first estimated internal resistance, which is an estimated value of internal resistance of the battery; calculate second charging power, at which the battery reaches the voltage upper limit, based on the voltage, the current, and second estimated internal resistance, which is an estimated value of internal resistance of the battery; and set the charging power upper limit, based on the first charging power and the second charging power.

A power storage system according to another aspect of the present disclosure includes: a battery; a voltmeter configured to measure voltage of the battery; an ammeter configured to measure current of the battery; and processing circuitry configured to control discharge of the battery to prevent discharging power exceeding discharging power upper limit from being discharged from the battery. The processing circuitry is further configured to: calculate first discharging power, at which the battery reaches voltage lower limit, based on estimated open-circuit voltage, which is an estimated value of open-circuit voltage of the battery, and first estimated internal resistance, which is an estimated value of internal resistance of the battery; calculate second discharging power, at which the battery reaches the voltage lower limit, based on the voltage, the current, and estimated internal resistance, which is an estimated value of internal resistance of the battery; and set the discharging power upper limit, based on the first and the second discharging power.

According to the present disclosure, there is provided a power storage system capable of appropriately controlling charging or discharging power for a battery.

BRIEF DESCRIPTION OF DRAWINGS

Exemplary embodiments of the present disclosure will be described in detail based on the following figures, wherein.

DESCRIPTION OF EMBODIMENTS

In the following, some embodiments of a power storage system of the present disclosure will be described in detail with reference to the drawings. Although examples will be described in which the power storage system of the present disclosure is a vehicular power storage system installed in a vehicle such as an automobile, the present disclosure is not limited thereto and can be applied to a variety of power storage systems. The same or similar elements are denoted by the same or similar reference signs, and a description thereof may be omitted or simplified as appropriate.

Vehicle

Figure 1:
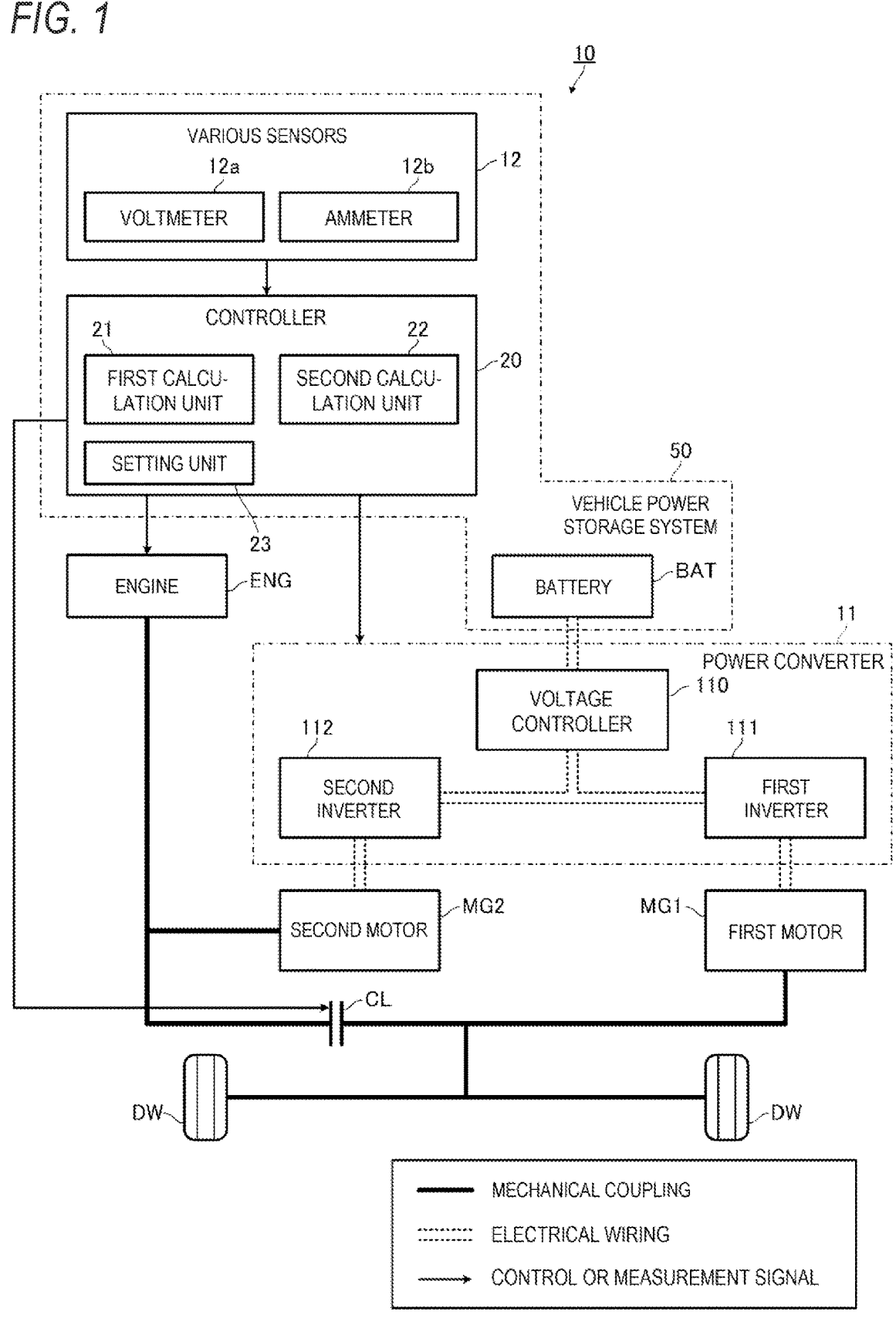
FIG. 1 shows a schematic configuration of a vehicle 10 in which a vehicle power storage system 50, which is an embodiment of a power storage system of the present disclosure, is installed.

First, a vehicle in which the vehicle power storage system of the present embodiment is installed will be described. As shown in FIG. 1, a vehicle 10, in which a vehicle power storage system 50 of the present embodiment is installed, is a hybrid electric vehicle and includes an engine ENG, a first motor MG1, a second motor MG2, a battery BAT, a clutch CL, a power converter 11, various sensors 12, and a controller 20. In FIG. 1, thick solid lines indicates mechanical coupling, double dotted lines indicate electrical wiring, and thin solid arrows indicate flow of control or measurement signals.

The engine ENG is, for example, a gasoline or diesel engine and is configured to output power generated by burning supplied fuel. The engine ENG is coupled to the second motor MG2 and to drive wheels DW of the vehicle 10 via the clutch CL. The power output from the engine ENG (hereinafter, also referred to as "output of the engine ENG") is transmitted to the second motor MG2 when the clutch CL is released and is transmitted to the second motor MG2 and the drive wheels DW when the clutch CL is engaged. The second motor MG2 and the clutch CL will be described later.

The first motor MG1 is a motor (drive motor) mainly used as a drive source of the vehicle 10 and is, for example, an AC motor. The first motor MG1 is electrically connected to the battery BAT and the second motor MG2 via the power converter 11. The first motor MG 1 can be supplied with electric power from at least the battery BAT or the second motor MG2. The first motor MG1 is configured to operate as an electric motor to output power for the vehicle 10 to travel when the first motor MG1 is supplied with electric power. The first motor MG1 is coupled to the drive wheels DW, and power output from the first motor MG1 (hereinafter, also referred to as "output of the first motor MG1") is transmitted to the drive wheels DW. The vehicle 10 is configured to travel with at least the output of the engine ENG or the first motor MG1 transmitted (supplied) to the drive wheels DW.

The first motor MG1 is configured to output regenerated power (perform regeneration) when the brakes of the vehicle 10 is applied (and the first motor MG1 is rotated by the engine ENG or the drive wheels DW). The regenerated power is, for example, supplied to the battery BAT via the power converter 11. Accordingly, the battery BAT can be charged with the regenerated power.

The regenerated power does not have to be supplied to the battery BAT and may be supplied to the second motor MG2 via the power converter 11 for disposal in which the regenerated power is consumed without being used to charge the battery BAT. At the time of the disposal, the regenerated power supplied to the second motor MG2 drives the second motor MG2, the power generated by the second motor MG2 is transmitted to and consumed in the engine ENG due to mechanical friction loss and the like.

The second motor MG2 is a motor (power-generating motor) mainly used as a generator and is, for example, an AC motor. The second motor MG2 is configured to generate electric power with output of the engine ENG driving the second motor MG2. The electric power generated by the second motor MG2 is supplied to at least the battery BAT or the first motor MG1 via the power converter 11, If the electric power is supplied to the battery BAT, the battery BAT can be charged. If the electric power is supplied to the first motor MG1, the first motor MG1 can be driven thereby.

The power converter 11 is a device (power control unit PCU) configured to transform current and is connected to the first motor MG1, the second motor MG2, and the battery BAT. The power converter 11 includes, for example, a first inverter 111, a second inverter 112, and a voltage controller 110, which are electrically connected to one another.

The voltage controller 110 is configured to transform current and may be a DC-to-DC converter. For example, when the power of the battery BAT is supplied to the first motor MG1, the voltage controller 110 steps up the output voltage of the battery BAT and outputs it to the first inverter 111. For example, when regenerated power is output from the first motor MG1, the voltage controller 110 steps down the output voltage of the first motor MG1 received via the first inverter 111 and outputs it to the battery BAT. When electric power is generated by the second motor MG2, the voltage controller 110 steps down the output voltage of the second motor MG2 received via the second inverter 112 and outputs it to the battery BAT.

When the power of the battery BAT is supplied to the first motor MG1, the first inverter 111 converts direct current of the battery BAT received via the voltage controller 110 into alternating current and outputs it to the first motor MG1. When regenerated power is output from the first motor MG1, the first inverter 111 converts alternating current received from the first motor MG1 to direct current and outputs it to the voltage controller 110. When the regenerated power is disposed of, the first inverter 111 converts the alternating current received from the first motor MG into direct current and outputs it to the second inverter 112.

When the electric power is generated by the second motor MG2, the second inverter 112 converts alternating current received from the second motor MG2 into direct current and outputs it to the voltage controller 110. When the regenerated power is disposed of, the second inverter 112 converts direct current received from the first motor MG1 via the first inverter 111 into alternating current and outputs it to the second motor MG2.

The battery BAT is a secondary battery configured to charge and discharge and includes a plurality of cells connected in series or in series parallel. The terminal voltage of the battery BAT is a high voltage, such as 100-400 V. The cells of the battery BAT may be a lithium-ion batter, a nickel-metal hydride battery, or the like.

The clutch CL can be switched to two states: one is a connected state (engaged state), in which a power transmission path from the engine ENG to the drive wheels DW is formed by engaging the clutch CL; and the other is a disconnected state (released state), in which the power transmission path is disconnected by releasing the clutch CL. The output of the engine ENG is transmitted to the drive wheels DW when the clutch CL is in the connected state and is not transmitted to the drive wheels DW when the clutch CL is in the disconnected state.

The various sensors 12 include, for example, a vehicle speed sensor configured to measure the speed (also referred to as "vehicle speed") of the vehicle 10, an accelerator position (AP) sensor configured to track the position of (operational input onto) the accelerator pedal of the vehicle 10, a brake sensor configured to track the position of (operational input onto) the brake pedal of the vehicle 10, and battery sensors configured to correct a variety of information related to the battery BAT.

The battery sensors includes, for example, a voltmeter 12a configured to measure voltage V of the battery BAT, and an ammeter 12b configured to measure current I of the battery BAT. The voltmeter 12a is configured to measure closed circuit voltage of the battery BAT as the voltage V of the battery BAT. The ammeter 12b is configured to measure input/output current of the battery BAT as the current I of the battery BAT. In the present embodiment, the current I of the battery BAT becomes a positive value when the battery BAT is discharged and becomes a negative value when the battery BAT is charged.

Output signals from the various sensors 12 including the voltmeter 12a and the ammeter 12b are transmitted to the controller 20. In addition to the voltmeter 12a and the ammeter 12b, the various sensors 12 may include (as a battery sensor) a temperature sensor configured to measure temperature of the battery BAT.

The controller 20 is configured to communicate with the engine ENG, the clutch CL, the power converter 11, and the various sensors 12. The controller 20 is configured to control, for example, the output of the engine ENG, the output of the first motor MG1 and the second motor MG2 by controlling the power converter 11, and the state of the clutch CL.

Further, the controller 20 is configured to control charge and discharge of the battery BAT. For example, the controller 20 sets an upper limit (charging power upper limit $TW_{IN\_now}$ to be described later) on charging power, which is power for charging the battery BAT, and performs control to prevent charging power exceeding the upper limit from being supplied to the battery BAT during charge of the battery BAI. In addition, the controller 20 sets an upper limit (discharging power upper limit $TW_{OUT\_now}$ to be described later) on discharging power, which is power discharged from the battery BAT, and performs control to prevent discharging power exceeding the upper limit from being discharged from the battery during discharge of the batter BAT. The controller 20 is configured to control the charging power and the discharging power for the battery BAT, for example, by controlling the power converter 11. Specific examples of charge and discharge control of the battery BAT by the controller 20 will be described later.

The controller 20 may be an electronic control unit (ECU) including, for example, processing circuitry configured to execute a variety of processing for controlling the vehicle 10, a memory configured to store a variety of information (data and programs) for controlling the vehicle 10, and an input/output device configured to control input and output of data between the inside and outside of the controller 20. The controller 20 may be a single ECU or a plurality of ECUs operable in cooperation with one another.

The vehicle power storage system 50 of the present embodiment includes the battery BAT, the various sensors 12 (specifically, the voltmeter 12a and the ammeter 12b), and the controller 20.

Driving Modes of Vehicle

Next, driving modes of the vehicle 10 will be described. The driving modes of the vehicle 10 includes an EV driving mode, a hybrid driving mode, and an engine driving mode, and the vehicle 10 travels in one of them under the control of the controller 20.

EV Driving Mode

The EV driving mode is a driving mode in which the vehicle 10 travels using the output of the first motor MG1 with only electric power from the battery BAT supplied to the first motor MG1.

Specifically, in the EV driving mode, the controller 20 causes the clutch CL to be in the disconnected state and cuts the fuel supply off from the engine ENG (fuel cut off) to stops the engine ENG from outputting power. Therefore, in the EV driving mode, the second motor MG2 does not generate electric power. The controller 20 causes the first motor MG1 to be supplied with only the electric power of the battery BAT, and the vehicle 10 travels using the output of the first motor MG1.

The controller 20 permits the vehicle 10 to travel in the EV driving mode on the condition that driving force (hereinafter, also referred to as "required driving force") required for traveling of the vehicle 10 is obtainable from the output of the first motor MG1 with only electric power from the battery BAT supplied to the first motor MG1.

Hybrid Driving Mode

The hybrid driving mode is a driving mode in which the vehicle 10 travels mainly using the output of the first motor MG1 with at least electric power generated by the second motor MG2 supplied to the first motor MG1.

Specifically, in the hybrid driving mode, the controller 20 causes the clutch CL to be in the disconnected state, allows the fuel supply to the engine ENG to cause the engine ENG to output power, and causes the second motor MG2 to be driven by the power of the engine ENG. Therefore, in the hybrid driving mode, the second motor MG2 generates electric power. The controller 20 disconnects the power transmission path by releasing the clutch CL and causes the first motor MG1 to be supplied with the electric power generated by the second motor MG2, and the vehicle 10 travels using the output of the first motor MG1.

The electric power supplied from the second motor MG2 to the first motor MG1 is larger than that supplied from the battery BAT to the first motor MG1. Therefore, the output of the first motor MG1 in the hybrid driving mode is larger than in the EV driving mode, and larger driving force (hereinafter, also referred to as "output of the vehicle 10") for traveling of the vehicle 10 is obtainable.

In addition, the controller 20 may cause the electric power of the battery BAT to be supplied to the first motor MG1 as necessary in the hybrid driving mode. That is, in the hybrid driving mode, the controller 20 may supply the first motor MG1 with electric power of both the second motor MG2 and the battery BM. In this case, as compared to a case in which the first motor MG1 is supplied with only the electric power of the second motor MG2, the electric power supplied to the first motor MG1 can be increased, and even larger driving force is obtainable.

Engine Driving Mode

The engine driving mode is a driving mode in which the vehicle 10 travels mainly using the output of the engine ENG.

Specifically, in the engine driving mode, the controller 20 causes the clutch CL to be in the connected state and allows the fuel supply to the engine ENG to cause the engine ENG to output power. Since the power transmission path is formed by engaging the clutch CL, the power of the engine ENG is transmitted to the drive wheels DW to drive the drive wheels DW. Accordingly, in the engine driving mode, the controller 20 causes the engine ENG to output power, and the vehicle 10 travels using the power.

In addition, the controller 20 may cause the electric power of the battery BAT to be supplied to the first motor MG1 as necessary in the engine driving mode. In this case, as compared to a case in which the vehicle 10 travels using only the power of the engine ENG, the vehicle 10 can also use the power of the first motor MG1 by supplying the electric power of the battery BAT to the first motor MG1, and larger driving force is obtainable. Further, since the output of the engine ENG can be reduced, fuel efficiency of the vehicle 10 can be enhanced.

Functional Configuration of Controller

Next, a functional configuration of the controller 20 will be described. As shown in FIG. 1, the controller 20 functionally includes, for example, a first calculation unit 21, a second calculation unit 22, and a setting unit 23, which are implemented by processing circuitry of the controller 20 executing programs stored in the memory of the controller 20.

For example, the controller 20 is configured to obtain the voltage V of the battery BAT measured by the voltmeter 12a and the current I of the battery BAT measured by the ammeter 12b at predetermined intervals (for example, at 1-second intervals). The controller 20 uses the voltage V obtained most recently as present voltage $V_{now}$ and the current I obtained most recently as present current $I_{now}$.

The controller 20 is configured to obtain estimated open-circuit voltage (OCV) $V_{OCV}$, which is an estimated value of OCV of the battery BAT, and estimated internal resistance $R_{now}$, which is an estimated value of present internal resistance of the battery BAT. The controller 20 may obtain the estimated OCV $V_{OCV}$ and the estimated internal resistance $R_{now}$ from other devices configured to estimate them or may estimate them by itself.

Any method may be employed for the estimation of them. For example, the estimated internal resistance $R_{now}$ is calculable from the voltage V (for example, the value $V_{now}$) and the current I (for example, the current $I_{now}$), and the estimated OCV $V_{OCV}$ is calculable from the estimated internal resistance $R_{now}$, the voltage V (for example, the voltage $V_{now}$), and the current I (for example, the current $I_{now}$).

In the present embodiment, the estimated internal resistance $R_{now}$ has two values: one is first estimated internal resistance $R_{now1}$ used by the first calculation unit 21, and the other is second estimated internal resistance $R_{now2}$ used by the second calculation unit 22. Accordingly, the first calculation unit 21 can calculate first charging power $P_{11}$ or first discharging power $P_{21}$ to be described later based on the first estimated internal resistance $R_{now1}$, which is suitable for the calculation of the first charging power $P_{11}$ or the first discharging power $P_{21}$. On the other hand, the second calculation unit 22 can calculate second charging power $P_{12}$ or second discharging power $P_{22}$ to be described later based on the second estimated internal resistance $R_{now2}$, which is suitable for the calculation of the second charging power $P_{12}$ or the second discharging power $P_{22}$.

Case Where Controller Controls Charge of Battery

First, functionality of each of the functional units in a case where the controller 20 controls charge of the battery BAT will be described.

The first calculation unit 21 calculates the first charging power $P_{11}$, at which the battery BAT reaches voltage upper limit $V_{H\_limit}$, based on the estimated OCV $V_{OCV}$ and the first estimated internal resistance $R_{now1}$. The voltage upper limit $V_{H\_limit}$ is a predetermined value. The first calculation unit 21 calculates the first charging power $P_{11}$, for example, from the following equation (1).

Equation 1

$$P_{11} = V_{H\_limit} \frac{V_{H\_limit} - V_{OCV}}{R_{now1}} \qquad (1)$$

From the above equation (1), the feedforward first charging power $P_{11}$ can be calculated. If the estimated OCV $V_{OCV}$ and the first estimated internal resistance $R_{now1}$ vary slightly, the first charging power $P_{11}$ stays stable. The first charging power $P_{11}$ is more stable than the second charging power $P_{12}$ to be described later is even if the voltage upper limit $V_{H\_limit}$ is quite different from the estimated OCV $V_{OCV}$.

The second calculation unit 22 calculates the second charging power $P_{12}$, at which the battery BAT reaches the voltage upper limit $V_{H\_limit}$, based on the voltage $V_{now}$, the current $I_{now}$, and the second estimated internal resistance $R_{now2}$. The second calculation unit 22 calculates the second charging power $P_{12}$, for example, from the following equation (2).

Equation 2

$$P_{12} = V_{H\_limit}\left( \frac{V_{H\_limit} - V_{now}}{R_{now2}} + I_{now} \right) \qquad (2)$$

From the above formula (2), the feedback second charging power $P_{12}$ can be calculated. The closer the voltage $V_{now}$ gets to the voltage upper limit (that is, the smaller $V_{H\_limit} - V_{now}$), the closer the second charging power $P_{12}$ gets to power (that is, proper charging power) at which the voltage V is the voltage upper limit $V_{H\_limit}$. In contrast, if the voltage $V_{now}$ is quite different from the voltage upper limit $V_{H\_limit}$, the second charging power $P_{12}$ tends to be quite different from the proper charging power and to be unstable (may vary greatly within a short period of time).

The setting unit 23 sets the charging power upper limit $TW_{IN\_now}$, based on the first charging power $P_{11}$ calculated by the first calculation unit 21 and the second charging power $P_{12}$ calculated by the second calculation unit 22.

Specifically, the setting unit 23 may set the charging power upper limit $TW_{IN\_now}$ to the first charging power $P_{11}$, to the second charging power $P_{12}$, or to combined charging power, which is calculated by combining the first charging power $P_{11}$ and the second charging power $P_{12}$ in a certain ratio.

Figure 2:
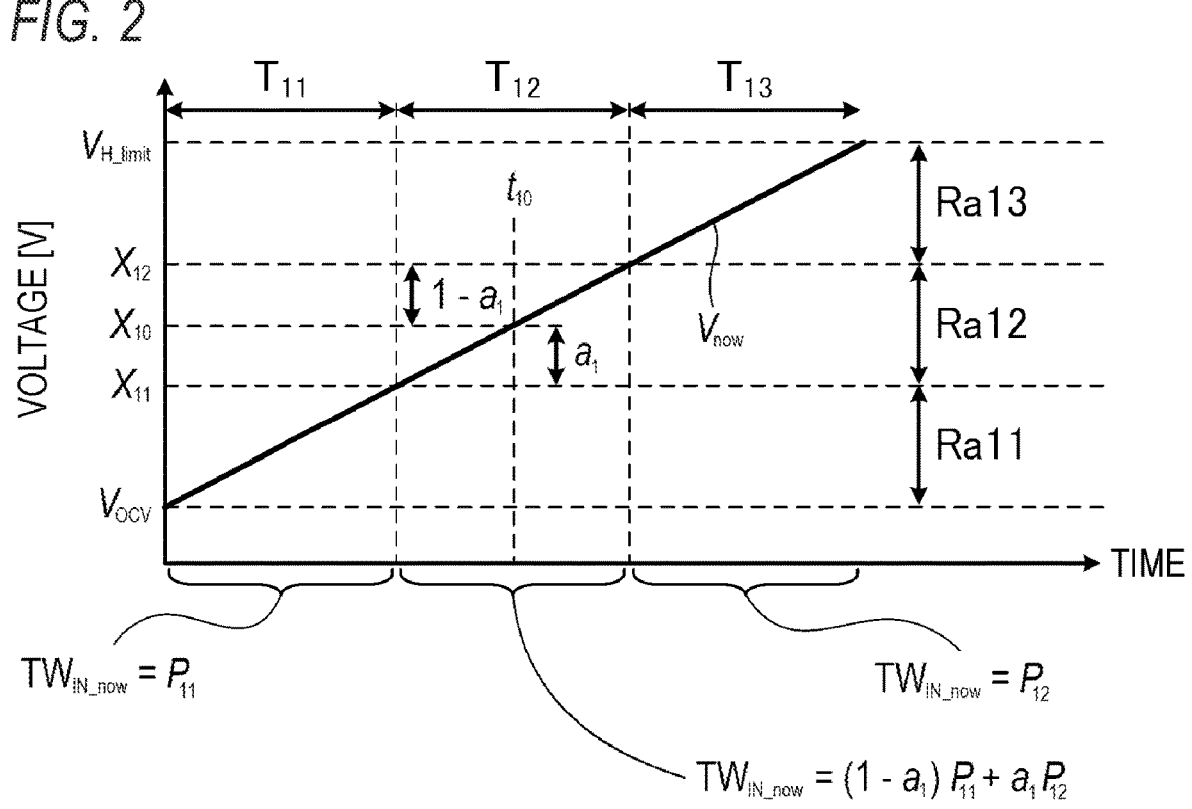
FIG. 2 shows a specific example of charge control for a battery BAT by a controller 20 of the vehicle power storage system 50.

The charging power upper limit $TW_{IN\_now}$ set by the setting unit 23 will be described in detail with reference to FIG. 2. FIG. 2 shows an example of variation of the voltage $V_{now}$ (that is, closed circuit voltage) over time during charge of the battery BAT. In FIG. 2, the vertical axis represents voltage, and the horizontal axis represents a time.

In the present embodiment, as shown in FIG. 2, a voltage range from the estimated OCV $V_{OCV}$ to the voltage upper limit $V_{H\_limit}$ is divided into three ranges: a first range Ra11, a second range Ra12, and a third range Ra13. The first range Ra11 ranges from the estimated OCV $V_{OCV}$ to combination-start voltage $X_{11}$, which is larger than the estimated OCV $V_{OCV}$. The second range Ra12 ranges from the combination-start voltage $X_{11}$ to a combination-end voltage $X_{12}$, which is larger than the combination-start voltage $X_{11}$. The third range Ra13 ranges from the combination-end voltage $X_{12}$ to the voltage upper limit $V_{H\_limit}$, which is larger than the combination-end voltage $X_{12}$.

The combination-start voltage $X_{11}$ is calculable, for example, from the following equation (3).

Equation 3

$$X_{11} = V_{OCV} + \tfrac{1}{3}(V_{H\_limit} - V_{OCV}) \qquad (3)$$

The combination-end voltage $X_{12}$ is calculable, for example, from the following equation (4).

Equation 4

$$X_{12} = V_{OCV} + \tfrac{2}{3}(V_{H\_limit} - V_{OCV}) \qquad (4)$$

The setting unit 23 sets the charging power upper limit $TW_{IN\_now}$ to the first charging power $P_{11}$ when the voltage $V_{now}$ is, as in a period $T_{11}$ shown in FIG. 2, within the first range Ra11. In other words, the setting unit 23 sets the charging power upper limit $TW_{IN\_now}$ to the first charging power $P_{11}$ when the voltage $V_{now}$ is close to the estimated OCV $V_{OCV}$ (that is, when the voltage $V_{now}$ is quite different from the voltage upper limit $V_{H\_limit}$), for example, immediately after the start of charging the battery BAT.

The setting unit 23 sets the charging power upper limit $TW_{IN\_now}$ to the combined charging power when the voltage $V_{now}$ is, as in a period $T_{12}$ shown in FIG. 2, within the second range Ra11. In other words, the setting unit 23 sets the charging power upper limit $TW_{IN\_now}$ to the combined charging power, for example, when the voltage $V_{now}$ has somewhat approached the voltage upper limit $V_{H\_limit}$ after the start of charging the battery BAT.

The combined charging power is calculable, for example, from the following equation (5).

Equation 5

$$TW_{IN\_now}=(1-\alpha_1)P_{11}+\alpha_1P_{12} \qquad (5)$$

As shown in the above equation (5), the combined charging power is the weighted sum of the first charging power $P_{11}$ and the second charging power $P_{12}$ with weights $1-\alpha_1$ and $\alpha_1$.

The weight $\alpha_1$ is difference between the voltage $V_{now}$ (for example, voltage $X_{10}$ [V] at a time $t_{10}$ shown in FIG. 2) obtained when the charging power upper limit $TW_{IN\_now}$ is calculated and the combination start voltage $X_{11}$. As shown in FIG. 2, the closer the voltage $V_{now}$ gets to the voltage upper limit $V_{H\_limit}$, the larger the weight $\alpha_1$. The weight $1-\alpha_1$ is difference between the voltage obtained when the when the charging power upper limit $TW_{IN\_now}$ is calculated and the combination-end voltage $X_{12}$. As shown in FIG. 2, the closer the voltage $V_{now}$ gets to the voltage upper limit $V_{H\_limit}$, the smaller the weight $1-\alpha_1$. That is, the closer the voltage $P_{12}$, gets to the voltage upper limit $V_{H\_limit}$, the closer the combined charging power gets to the second charging power $P_{12}$.

The setting unit 23 sets the charging power upper limit $TW_{IN\_now}$ to the second charging power $P_{11}$ when the voltage $V_{now}$ is, as in a period $T_{13}$ shown in FIG. 2, within the third range Ra13. In other words, the setting unit 23 sets the charging power upper limit $TW_{IN\_now}$ to the second charging power $P_{12}$, for example, when the voltage $V_{now}$ has sufficiently approached the voltage upper limit $V_{H\_limit}$ well after the start of charging the battery BAT.

As described above, the controller 20 sets the charging power upper limit $TW_{IN\_now}$ to the first charging power $P_{11}$ when the voltage $V_{now}$ is close to the estimated OCV $V_{OCV}$ (that is, when the voltage $V_{now}$ is quite different from the voltage upper limit $V_{H\_limit}$), for example, immediately after the start of charging the battery BAT. The feed-forward first charging power $P_{11}$ stays stable even if the voltage upper limit $V_{H\_limit}$ is quite different from the estimated OCV $V_{OCV}$. Therefore, by setting the charging power upper limit $TW_{IN\_now}$ to the first charging power $P_{11}$ when the voltage $V_{now}$ is quite different from the voltage upper limit $V_{H\_limit}$, it becomes possible to stabilize the charging power upper limit $TW_{IN\_now}$, enabling appropriate control of charging power for the battery BAT.

The controller 20 causes the charging power upper limit to be closer to the second charging power $P_{12}$ as the voltage $V_{now}$ gets closer to the voltage upper limit $V_{H\_limit}$. The closer the voltage $V_{now}$ gets to the voltage upper limit $V_{H\_limit}$, the closer the feedback second charging power $P_{12}$ gets to proper charging power, Therefore, by gradually switching the charging power upper limit $TW_{IN\_now}$ to the second charging power $P_{12}$ as the voltage $V_{now}$ get closer to the voltage upper limit $V_{H\_limit}$, it becomes possible to control charging power for the battery BAT appropriately.

As described above, the controller 20 can set the charging power upper limit $TW_{IN\_now}$ to an appropriate value according to the present charging state (for example, how long has it been since the start of charge) of the battery BAT, enabling appropriate control of charging power for the battery BAT. Accordingly, the battery BAT can be protected from excessive charging power, which may deteriorate the battery BAT, and the battery BAT can be charged efficiently in a short time.

In the present embodiment, the combination-start voltage $X_{11}$ and the combination-end voltage $X_{12}$ are not constant but vary according to the difference between the estimated OCV $V_{OCV}$ and the voltage upper limit $V_{H\_limit}$. While voltage upper limit $V_{H\_limit}$ is substantially constant, the estimated OCV $V_{OCV}$ varies depending on, for example, the state of charge (SoC) or temperature of the battery BAT. Therefore, the difference between the estimated OCV $V_{OCV}$ and the voltage upper limit $V_{H\_limit}$ limit may vary widely. If the combination-start voltage $X_{11}$ and the combination-end voltage $X_{12}$ were constant values, the first range Ra11, the second range Ra12, and the third range Ra13 could not be appropriately set if the difference between the estimated OCV $V_{OCV}$ and the voltage upper limit $V_{H\_limit}$ quite large or small. As a result, it may be difficult to gradually switch the charging power upper limit $TW_{IN\_now}$, to the second charging power $P_{12}$ from the first charging power $P_{11}$ as the voltage $V_{now}$ gets closer to the voltage upper limit $V_{H\_limit}$. In contrast, in the present embodiment, since the combination-start voltage $X_{11}$ and the combination-end voltage $X_{12}$ vary according to t according to the difference between the estimated OCV $V_{OCV}$ and the voltage upper limit $V_{H\_limit}$, it becomes possible to set the charging power upper limit $TW_{IN\_now}$ appropriately even if the difference between the estimated OCV $V_{OCV}$ and the voltage upper limit $V_{H\_limit}$, is quite large or small.

Case Where Controller Controls Discharge of Battery

Next, functionality of each of the functional units in a case where the controller 20 controls discharge of the battery BAF will be described.

The first calculation unit 21 calculates the first discharging power $P_{21}$, at which the battery BAT reaches voltage lower limit $V_{L\_limit}$, based on the estimated OCV $V_{OCV}$ and the first estimated internal resistance $R_{now1}$. The voltage lower limit $V_{H\_limit}$ is a predetermined value. The first calculation unit 21 calculates the first discharging power $P_{21}$, for example, from the following equation (6).

Equation 6

$$P_{21} = V_{L\_limit}\frac{V_{L\_limit} - V_{OCV}}{R_{now1}} \qquad (6)$$

From the above equation (6), the feedforward first discharging power $P_{21}$ can be calculated. If the estimated OCA $V_{OCV}$ and the first estimated internal resistance $R_{now1}$ vary slightly, the first discharging power $P_{21}$ stays stable. The first discharging power $P_{21}$ is more stable than the second discharging power $P_{22}$ to be described later is even if the voltage lower limit $V_{L\_limit}$ is quite different from the estimated OCV $V_{OCV}$.

The second calculation unit 22 calculates the second discharging power $P_{22}$, at which the battery BAT reaches the voltage lower limit $V_{H\_limit}$, based on the voltage $V_{now}$, the current $I_{now}$, and the second estimated internal resistance $R_{now2}$. The second calculation unit 22 calculates the second discharging power $P_{22}$, for example, from the following equation (7).

Equation 7

$$P_{22} = V_{L\_limit}\left(\frac{V_{L\_limit} - V_{now}}{R_{now2}} + I_{now}\right) \quad (7)$$

From the above formula (7), the feedback second discharging power $P_{22}$ can be calculated. The closer the voltage $V_{now}$ gets to the voltage lower limit $V_{L\_limit}$ (that is, the smaller $V_{H\_limit}$), the closer the second discharging power $P_{22}$ gets to power (that is, proper discharging power) at which the voltage $V$ is the voltage lower limit $V_{L\_limit}$. In contrast, if the voltage $V_{now}$ is quite different from the voltage lower limit $V_{L\_limit}$, the second discharging power $P_{22}$ tends to be quite different from the proper discharging power and to be unstable (may vary greatly within a short period of time).

The setting unit 23 sets the discharging power upper limit $TW_{OUT\_now}$, based on the first discharging power $P_{21}$ calculated by the first calculation unit 21 and the second discharging power $P_{22}$ calculated by the second calculation unit 22.

Specifically, the setting unit 23 may set the discharging power upper limit $TW_{OUT\_now}$ to the first discharging power $P_{21}$, to the second discharging power $P_{22}$, or to combined discharging power, which is calculated by combining the first discharging power $P_{21}$ and the second discharging power $P_{22}$ in a certain ratio.

Figure 3:
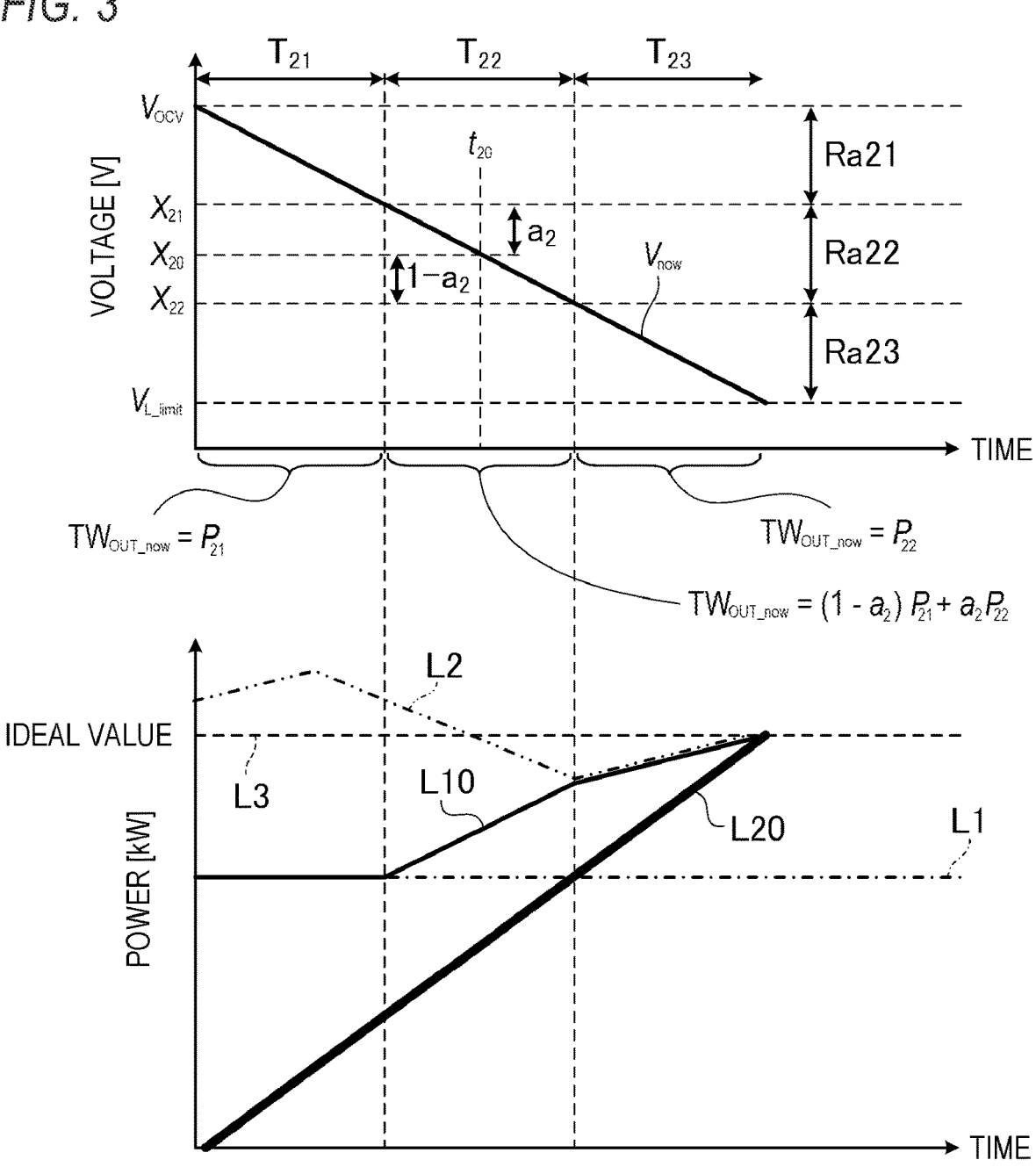
FIG. 3 shows a specific example of discharge control for the battery BAT by the controller 20 of the vehicle power storage system 50.

The discharging power upper limit $TW_{OUT\_now}$ set by the setting unit 23 will be described in detail with reference to FIG. 3. FIG. 3 shows an example of variation of the voltage $V_{now}$ (that is, closed circuit voltage) over time during discharge of the battery BAT. In FIG. 2, a vertical axis represents voltage, and a horizontal axis represents a time.

In the present embodiment, as shown in FIG. 3, a voltage range from the estimated OCV $V_{OCV}$ to the voltage lower limit $V_{L\_limit}$ is divided into three ranges: a first range Ra21, a second range Ra22, and a third range Ra23. The first range Ra21 ranges from the estimated OCV $V_{OCV}$ to combination-start voltage $X_{21}$, which is smaller than the estimated OCV $V_{OCV}$. The second range Ra22 ranges from the combination-start voltage $X_{21}$ to a combination-end voltage $X_{22}$, which is smaller than the combination-start voltage $X_{21}$. The third range Ra23 ranges from the combination-end voltage $X_{22}$ to the voltage lower limit $V_{L\_limit}$, which is smaller than the combination-end voltage $X_{22}$.

The combination-start voltage $X_{21}$ is calculable, for example, from the following equation (8).

Equation 8

$$X_{21} = V_{OCV} - \frac{1}{3}(V_{L\_limit} - V_{OCV}) \quad (8)$$

The combination-end voltage $X_{22}$ is calculable, for example, from the following equation (9).

Equation 9

$$X_{22} = V_{OCV} - \frac{2}{3}(V_{L\_limit} - V_{OCV}) \quad (9)$$

The setting unit 23 sets the discharging power upper limit $TW_{OUT\_now}$ to the first discharging power $P_{21}$ when the voltage $V_{now}$ is, as in a period $T_{21}$ shown in FIG. 3, within the first range Ra21. In other words, the setting unit 23 sets the discharging power upper limit $TW_{OUT\_now}$ to the first discharging power $P_{21}$ when the voltage $V_{now}$ is close to the estimated OCV $V_{OCV}$ (that is, when the voltage $V_{now}$ is quite different from the voltage lower limit $V_{L\_limit}$), for example, immediately after the start of discharging the battery BAT.

The setting unit 23 sets the discharging power upper limit $TW_{OUT\_now}$ to the combined discharging power when the voltage $V_{now}$ is, as in a period $T_{22}$ shown in FIG. 3, within the second range Ra22. In other words, the setting unit 23 sets the discharging power upper limit $TW_{OUT\_now}$ to the combined discharging power, for example, when the voltage $V_{now}$ has somewhat approached the voltage lower limit $V_{L\_limit}$ after the start of discharging the battery BAT.

The combined discharging power is calculable, for example, from the following equation (10).

Equation 10

$$TW_{OUT\_now} = (1-\alpha_2)P_{21} + \alpha_2 P_{22} \quad (10)$$

As shown in the above equation (10), the combined discharging power is the weighted sum of the first discharging power $P_{21}$ and the second discharging power $P_{22}$ with weights $1-\alpha_2$ and $\alpha_2$.

The weight $\alpha_2$ is difference between the voltage $V_{now}$ (for example, voltage $X_{20}$ [V] at a time $t_{20}$ shown in FIG. 3) obtained when the discharging power upper limit $TW_{OUT\_now}$ is calculated and the combination-start voltage $X_{21}$. As shown in FIG. 3, the closer the voltage $V_{now}$ gets to the voltage lower limit $V_{L\_limit}$, the larger the weight $\alpha_2$. The weight $1-\alpha_2$ is difference between the voltage $V_{now}$ obtained when the when the charging power lower limit $TW_{OUT\_now}$ is calculated and the combination-end voltage $X_{22}$. As shown in FIG. 3, the closer the voltage $V_{now}$ gets to the voltage lower limit $V_{L\_limit}$, the smaller the weight $1-\alpha_2$. That is, the closer the voltage $V_{now}$ gets to the voltage lower limit $V_{L\_limit}$, the closer the combined discharging power gets to the second discharging power $P_{22}$.

The setting unit 23 sets the discharging power upper limit $TW_{OUT\_now}$ to the second discharging power $P_{22}$ when the voltage $V_{now}$ is, as in a period $T_{23}$ shown in FIG. 3, within the third range Ra23. In other words, the setting unit 23 sets the discharging power upper limit $TW_{OUT\_now}$ to the second discharging power $P_{22}$, for example, when the voltage $V_{now}$ has sufficiently approached the voltage lower limit $V_{L\_limit}$ well after the start of discharging the battery BAT.

As described above, the controller 20 sets the discharging power upper limit $TW_{OUT\_now}$ to the first discharging power $P_{21}$ when the voltage $V_{now}$ is close to the estimated OCV $V_{OCV}$ (that is, when the voltage $V_{now}$ is quite different from the voltage lower limit $V_{L\_limit}$), for example, immediately after the start of discharging the battery BAT. The feedforward first discharging power $P_{21}$ stays stable even if the voltage lower limit $V_{L\_limit}$ is quite different from the estimated OCV $V_{OCV}$. Therefore, by setting the discharging power upper limit $TW_{OUT\_now}$ to the first discharging power $P_{21}$ when the voltage $V_{now}$ is quite different from the voltage lower limit $V_{L\_limit}$, it becomes possible to stabilize the discharging power upper limit $TW_{OUT\_now}$, enabling appropriate control of discharging power for the battery BAT.

The controller 20 causes the discharging power upper limit $TW_{OUT\_now}$ to be closer to the second discharging power $P_{22}$ as the voltage $V_{now}$ gets closer to the voltage lower limit $V_{L\_limit}$. The closer the voltage $V_{now}$ gets to the voltage lower limit $V_{L\_limit}$, the closer the feedback second discharging power $P_{22}$ gets to proper discharging power. Therefore, by gradually switching the discharging power upper limit $TW_{OUT\_now}$ to the second discharging power $P_{22}$ as the voltage $V_{now}$ get closer to the voltage lower limit $V_{L\_limit}$, it becomes possible to control discharging power for the battery BAT appropriately.

As described above, the controller 20 can set the discharging power upper limit $TW_{OUT\_now}$ to an appropriate value according to the present charging state (for example, how long has it been since the start of discharge) of the battery BAT, enabling appropriate control of discharging power for the battery BAT. Accordingly, the battery BAT can be protected from excessive discharging power, which may deteriorate the battery BAT, and optimal performance can be obtained from the battery BAT.

The dash-dotted line L1, the dash-dash-dotted curve L2, and the broken line in FIG. 3 represents the first discharging power $P_{21}$, the second discharging power $P_{22}$, and ideal values of the discharging power upper limit $TW_{OUT\_now}$ respectively. As described above, by setting the discharging power upper limit $TW_{OUT\_now}$ to the first discharging power $P_{21}$ when the voltage $V_{now}$ is quite different from the voltage lower limit $V_{L\_limit}$ and by gradually switching the discharging power upper limit $TW_{OUT\_now}$ to the second discharging power $P_{22}$ as the voltage $V_{now}$ get closer to the voltage lower limit $V_{L\_limit}$, the controller 20 can change the discharging power upper limit $TW_{OUT\_now}$ as indicated by the solid curve L10 in FIG. 3, and actual discharging power of the battery BAT can be controlled as indicated by the solid line L20 in FIG. 3. Therefore, it becomes possible to obtain optimal performance from the battery BAT while protecting the battery BAT from excessive discharging power.

As described above, according to the present embodiment, it becomes possible to control the charging or discharging power for the battery BAT appropriately.

Although some embodiments of the present disclosure have been described above, the present disclosure is not limited thereto. Modifications, improvements, and the like can be made as appropriate.

For example, although the first range Ra11, the second range Ra12, and the third range Ra13 have the same width in the above, the present disclosure is not limited thereto. Their widths may be different from one another, and some of them may be the same. Similarly, the widths of the first range Ra21, the second range Ra22, and the third range Ra23 may be different from one another, and some of them may be the same.

Although the controller 20 controls both charge and discharge of the battery BAT in the above, the present disclosure is not limited thereto. The controller 20 may control only one of the charge and discharge. In this case, the other of the charge and discharge may be controlled by another controller instead of the controller 20.

Although the estimated internal resistance $R_{now2}$ has two values in the above; which are the first estimated internal resistance $R_{now1}$ used by the first calculation unit 21 and the second estimated internal resistance $R_{now2}$ used by the second calculation unit 22, the present disclosure is not limited thereto. The first calculation unit 21 and the second calculation unit 22 may use common estimated internal resistance $R_{now}$.

Although the vehicle power storage system 50 is installed in the vehicle 10 that is a hybrid electric vehicle in the above, the present disclosure is not limited thereto. The vehicle 10, in which the vehicle power storage system 50 is installed, may be, for example, an electric vehicle (such as a battery electric vehicle) or a fuel cell electric vehicle.

In the present specification, at least the following are described. The present disclosure is not limited to elements or the like in parentheses.

(1) A power storage system (vehicle power storage system 50) including:

a battery (BAT);

a voltmeter (12a) configured to measure voltage (V) of the battery (BAT);

an ammeter (12b) configured to measure current (I) of the battery (BAT); and a controller (20) configured to control charge of the battery (BAT) to prevent charging power exceeding charging power upper limit $(TW_{IN\_now})$ from being supplied to the battery (BAT), in which the controller (20) includes:

a first calculation unit (21) configured to calculate first charging power $(P_{11})$, at which the battery (BAT) reaches voltage upper limit $(V_{H\_limit})$, based on estimated open-circuit voltage $(V_{OCV})$, which is an estimated value of open-circuit voltage of the battery (BAT), and estimated internal resistance $(R_{now}$, first estimated internal resistance $R_{now1})$, which is an estimated value of internal resistance of the battery (BAT);

a second calculation unit (22) configured to calculate second charging power $(P_{12})$, at which the battery (BAT) reaches the voltage upper limit $(V_{H\_limit})$, based on the voltage $(V, V_{now})$ measured by the voltmeter (12a), the current $(I, I_{now})$ measured by the ammeter (12b), and estimated internal resistance $(R_{now}$, second estimated internal resistance $R_{now2})$; which is an estimated value of internal resistance of the battery (BAT); and a setting unit (23) configured to set the charging power upper limit $(TW_{IN\_now})$, based on the first charging power $(P_{11})$ calculated by the first calculation unit (21) and the second charging power $(P_{12})$ calculated by the second calculation unit (22).

According to (1), since the charging power upper limit is set appropriately based on the feedforward first charging power and the feedback second charging power, the battery can be charged at appropriate charging power.

(2) The power storage system (vehicle power storage system 50) according to (1), in which the setting unit (23) is configured to set, according to the present voltage $(V_{now})$, the charging power upper limit $(TW_{IN\_now})$ to the first charging power $(P_{11})$, to the second charging power $(P_{12})$, or to charging power calculable by combining the first charging power $(P_{11})$ and the second charging power $(P_{12})$ in a certain ratio.

According to (2), it becomes possible to set the charging power upper limit appropriately during charge according to the present charging state.

(3) The power storage system (vehicle power storage system 50) according to (2), in which the setting unit (23) is configured to set the charging power upper limit $(TW_{IN\_now})$ to:

the first charging power $(P_{11})$ when the present voltage $(V_{now})$ is within a first range (Ra11), which ranges from the estimated open-circuit voltage $(V_{OCV})$ to combination-start voltage $(X_{11})$, which is larger than the estimated open-circuit voltage $(V_{OCV})$ is;

the charging power calculable by combining the first charging power $(P_{11})$ and the second charging power $(P_{12})$ in a certain ratio when the present voltage $(V_{now})$ is within a second range (Ra12), which ranges from the combination-start voltage $(X_{11})$ to combination-end voltage $(X_{12})$, which is larger than the combination-start voltage $(X_{11})$ is; and the second charging power $(P_{12})$ when the present voltage $(V_{now})$ is within a third range (Ra13), which ranges from the combination-end voltage $(X_{12})$ to the voltage upper limit $(V_{H\_limit})$, which is larger than the combination-end voltage $(X_{12})$ is.

According to (3), when the battery is charged, it is possible to set an appropriate charging power upper limit value according to a state of charge at that time.

(4) The power storage system (vehicle power storage system 50) according to (3), in which the combination-start voltage ($X_{11}$) and the combination-end voltage ($X_{12}$) depend on difference between the estimated open-circuit voltage ($V_{OCV}$) and the voltage upper limit ($V_{H\_limit}$).

According to (4), it becomes possible to set the charging power upper limit appropriately even if the difference between the estimated open-circuit voltage and the voltage upper limit is quite large or small.

(5) The power storage system (vehicle power storage system 50) according to any one of (2) to (4), in which the charging power calculable by combining the first charging power ($P_{11}$) and the second charging power ($P_{12}$) in a certain ratio is the weighted sum of the first charging power ($P_{11}$) and the second charging power ($P_{12}$) with a first weight ($1-\alpha_1$) and a second weight ($\alpha_1$), and the first weight ($1-\alpha_1$) and the second weight ($\alpha_1$) vary according to the present voltage ($V_{now}$).

According to (5), it becomes possible to cause the charging power upper limit to be closer to the feedback second charging power, which approaches appropriate charging power, as the present voltage of the battery gets closer to the voltage upper limit.

(6) The power storage system (vehicle power storage system 50) according to (5), in which the closer the present voltage ($V_{now}$) gets to the voltage upper limit ($V_{H\_limit}$), the smaller the first weight ($1-\alpha_1$), and the closer the present voltage ($V_{now}$) gets to the voltage upper limit ($V_{H\_limit}$), the larger the second weight ($\alpha_1$).

According to (6), it becomes possible to cause the charging power upper limit to be closer to the feedback second charging power, which approaches appropriate charging power, as the present voltage of the battery gets closer to the voltage upper limit.

(7) The power storage system according to any one of (1) to (6), in which the first calculation unit (21) uses first estimated internal resistance ($R_{now1}$) as the estimated internal resistance ($R_{now}$), and the second calculation unit (22) uses second estimated internal resistance ($R_{now2}$), which is different from the first estimated internal resistance ($R_{now1}$), as the estimated internal resistance ($R_{now}$).

According to (7), the first calculation unit can calculate the first charging power, based on the first estimated internal resistance, which is suitable for the calculation of the first charging power, and the second calculation unit can calculate the second charging power, based on the second estimated internal resistance, which is suitable for the calculation of the second charging power.

(8) A power storage system (vehicle power storage system 50) including:

a battery (BAT);

a voltmeter (12a) configured to measure voltage (V) of the battery (BAT);

an ammeter (12b) configured to measure current (I) of the battery (BAT); and a controller (20) configured to control discharge of the battery (BAD to prevent discharging power exceeding predetermined discharging power upper limit ($TW_{OUT\_now}$) from being discharged from the battery (BAT), in which the controller (20) includes:

a first calculation unit (21) configured to calculate first discharging power ($P_{21}$), at which the battery (BAT) reaches voltage lower limit ($V_{L\_limit}$), based on estimated open-circuit voltage ($V_{OCV}$), which is an estimated value of open-circuit voltage of the battery (BAT), and estimated internal resistance ($R_{now}$, first estimated internal resistance $R_{now1}$), which is an estimated value of internal resistance of the battery (BAT);

a second calculation unit (22) configured to calculate second discharging power ($P_{22}$), at which the battery (BAT) reaches the voltage lower limit ($V_{L\_limit}$), based on the voltage (V, $V_{now}$) measured by the voltmeter (12a), the current (I, $I_{now}$) measured by the ammeter (12b), and estimated internal resistance ($R_{now}$, second estimated internal resistance $R_{now2}$), which is an estimated value of internal resistance of the battery (BAT); and a setting unit (23) configured to set the discharging power upper limit ($TW_{OUT\_now}$), based on the first discharging power ($P_{21}$) calculated by the first calculation unit (21) and the second discharging power ($P_{22}$) calculated by the second calculation unit (22).

According to (8), since the discharging power upper limit value is set based on the first discharging power as the feedforward calculation value and the second discharging power as the feedback calculation value, an appropriate discharging power upper limit value can be set, and appropriate discharging power can be discharged from the battery.

What is claimed is:

1. A power storage system comprising:

a battery;

a voltmeter configured to measure a voltage of the battery;

an ammeter configured to measure a current of the battery; and processing circuitry configured to control charge of the battery to prevent a charging power exceeding a charging power upper limit from being supplied to the battery, wherein the processing circuitry is further configured to:

calculate a first charging power, at which the battery reaches a voltage upper limit, based on an estimated open-circuit voltage, which is an estimated value of an open-circuit voltage of the battery, and a first estimated internal resistance, which is an estimated value of an internal resistance of the battery;

calculate a second charging power, at which the battery reaches the voltage upper limit, based on the voltage, the current, and a second estimated internal resistance, which is an estimated value of an internal resistance of the battery; and set the charging power upper limit, based on the first charging power and the second charging power, the processing circuitry is configured to set, according to the present voltage, the charging power upper limit to the first charging power, to the second charging power, or to an intermediate charging power, which is between the first and the second charging power, the intermediate charging power is the weighted sum of the first and the second charging power with a first and a second weights, and the first and the second weights vary according to the present voltage.

2. The power storage system according to claim 1, wherein the processing circuitry is configured to set the charging power upper limit to:

the first charging power when the present voltage is within a first range, which ranges from the estimated open-circuit voltage to a combination-start voltage, which is larger than the estimated open-circuit voltage is;

the intermediate charging power when the present voltage is within a second range, which ranges from the combination-start voltage to a combination-end voltage, which is larger than the combination-start voltage is; and the second charging power when the present voltage is within a third range, which ranges from the combination-end voltage to the voltage upper limit, which is larger than the combination-end voltage is.

3. The power storage system according to claim 2, wherein the combination-start and the combination-end voltage depend on a difference between the estimated open-circuit voltage and the voltage upper limit.

4. The power storage system according to claim 1, wherein the closer the present voltage gets to the voltage upper limit, the smaller the first weight, and the closer the present voltage gets to the voltage upper limit, the larger the second weight.

5. A power storage system comprising:

a battery;

a voltmeter configured to measure a voltage of the battery;

an ammeter configured to measure a current of the battery; and processing circuitry configured to control discharge of the battery to prevent a discharging power exceeding a discharging power upper limit from being discharged from the battery, wherein the processing circuitry is further configured to:

calculate a first discharging power, at which the battery reaches a voltage lower limit, based on an estimated open-circuit voltage, which is an estimated value of an open-circuit voltage of the battery, and a first estimated internal resistance, which is an estimated value of an internal resistance of the battery;

calculate a second discharging power, at which the battery reaches the voltage lower limit, based on the voltage, the current, and an estimated internal resistance, which is an estimated value of an internal resistance of the battery; and set the discharging power upper limit, based on the first and the second discharging power, the processing circuitry is configured to set, according to the present voltage, the charging power upper limit to the first charging power, to the second charging power, or to an intermediate charging power, which is between the first and the second charging power, the intermediate charging power is the weighted sum of the first and the second charging power with a first and a second weights, and the first and the second weights vary according to the present voltage.

* * * * *